Patented Mar. 16, 1954

2,672,463

UNITED STATES PATENT OFFICE 2,672,463

S-CARBOXYETHYL-THIOISOSEMI-CARBAZONES

Charles F. Huebner, Morristown, N. J., assignor to Ciba Pharmaceutical Products, Incorporated, Summit, N. J., a corporation of New Jersey No Drawing. Application May 3, 1951, Serial No. 224,453

6 Claims. (Cl. 260—340.5)

This invention relates to certain S-carboxyethyl derivatives of aromatic aldehyde thioisosemicarbazones and to the preparation thereof.

A primary object of the present invention is the embodiment of a new group of compounds which are characterized by marked antitubercular activity while at the same time exhibiting markedly lower toxicity than the comparable known prior art compounds. A further object of the invention is the development of a process for the realization of such embodiment.

These objects and others which will be evident from the following specification are realized (a) by the new substituted β-(1-benzylidine-3-thio-3-isosemicarbazide)-propionic acids and substituted β-(1-benzylidine-3-thio - 3 - isosemicarbazide)-ethane sulfonic acids of the present invention which correspond to the formula $$X-Y-CH=N-N=\overset{NH_2}{\underset{|}{C}}-S-CH_2CH_2-Z$$

wherein Y is a benzene nucleus and X is alkoxy (e. g. methoxy, ethoxy, propoxy, etc.) or acylamino (e. g. acetamido, propionamido, butyramido, etc.) attached to one of the meta and para positions of Y, and methylenedioxy attached to the meta-para positions of Y, and Z is carboxyl (COOH) or sulfonyl (SO₃H) and by the water-soluble salts of the said new compounds with either acids or bases, and (b) by the preparation of the said compounds by reacting an appropriate aromatic aldehyde thiosemicarbazone with a reactive ester of β-hydroxy-propionic acid, namely, β-propiolactone, β-bromo-propionic acid or β-iodo-propionic acid, or with a similar reactive ester of β-hydroxyethane-sulfonic acid, in a polar solvent such as alcohol, dioxane and the like.

The reaction scheme for the process of preparation of the aforesaid new compounds according to the present invention is as follows:

$$X-Y-CH=N-NH-\overset{NH_2}{\underset{|}{C}}=S + HOCH_2CH_2-Z\text{-reactive ester} \longrightarrow$$

$$X-Y-CH=N-N=\overset{NH_2}{\underset{|}{C}}-S-CH_2CH_2-Z$$

wherein X, Y and Z have the previously-indicated significances. The reaction is carried out conveniently at elevated temperatures, such as the reflux temperatures of the solvents employed. After the reaction is completed, the solvent is evaporated off and the residue treated with an aqueous solution of a weak alkali, such as sodium bicarbonate, whereupon unreacted starting material is removed by filtration. The filtrate is then neutralized with a weak acid such as acetic acid, whereupon the amino acid is precipitated and for further purification is recrystallized from a lower aliphatic alcohol. The products may be used in this form as a therapeutic agent in view of their antitubercular activity or, if desired, advantage may be taken of their capacity for forming water-soluble salts, in which event they may be converted into salt form with the aid of appropriate acids such as hydrochloric, citric, maleic, sulfuric, phosphoric, ethanesulfonic, etc., whereby the corresponding hydrochloride, citrate, maleate, sulfate, phosphate, ethanesulfonate, etc. is formed, or with the aid of appropriate bases such as the hydroxides of the alkali metals (e. g. sodium, potassium) or alkaline earth (e. g. magnesium) metals, whereby the corresponding metal salts are formed.

In many instances, the product will crystallize from the reaction mixture when the latter is refrigerated. In such cases, the solvent is removed by filtration rather than evaporation, and the residue treated as precedingly described.

The invention is illustrated in greater detail in the examples which follow and which are presented by way of illustration only and not by way of limitation. In these examples, parts by weight bear the same relation to parts by volume as do grams to milliliters. Temperatures are expressed in degrees centigrade and all melting points are uncorrected.

*Example 1*

A mixture of 50 parts by weight of 1-(4-acetamido-benzyaldehyde)-3-thiosemicarbazone,

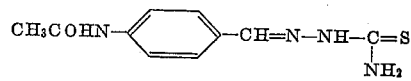
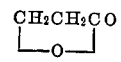

and 15.5 parts by weight of β-propiolactone,

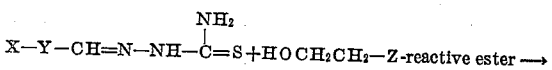

is refluxed in 500 parts by volume of ethanol for 3 hours. After refrigeration overnight, the formed crude amino acid is filtered. To separate the product from a small amount of unreacted thiosemicarbazone, the crude product is suspended in 200 parts by volume of water containing 20 parts by weight of sodium bicarbonate, and the mixture warmed to 50° for a few minutes. The amino acid dissolves as the sodium salt, and the undissolved thiosemicarbazone is removed by filtration. Neutralization of the cooled filtrate with acetic acid (pH about 6) results in the crystallization of pure β-[1-(4-acetamido-benzylidine) - 3 - thio - 3 - isosemicarbazide]-propionic acid:

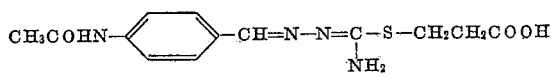

in the form of the dihydrate. The substance is recrystallized from water, whereupon its melting point is 122–125° (with decomposition). The hydrochloride, which melts at 210–211° (with decomposition), is prepared by warming the amino acid in an equivalent of 3-normal hydrochloric acid and then cooling. The hydrochloride is freely soluble in water (pH 5). An aqueous solution of the sodium salt is prepared by warming the amino acid with one molar equivalent of sodium bicarbonate (pH 8).

Example 2

A mixture of 10 parts by weight of anisaldehyde thiosemicarbazone and 4.5 parts by weight of β-propiolactone is refluxed in 50 parts by volume of ethanol for 15 minutes. On cooling, the formed amino acid crystallizes out. It is purified by the bicarbonate treatment, described in Example 1. The β-(1-anisylidine-3-thio-3-isosemicarbazide)-propionic acid:

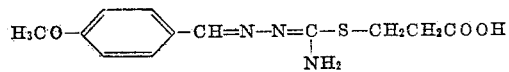

thus obtained is recrystallized from ethanol and melts at 110° (with decomposition). The hydrochloride is prepared as described in Example 1 and melts at 198–199° (with decomposition) after it has been recrystallized from ethanol.

Example 3

By replacing the anisaldehyde thiosemicarbazone of Example 2 by an equivalent quantity of 4-ethoxy-benzaldehyde thiosemicarbazone and otherwise proceeding as described in the said example, the corresponding β-[1-(4-ethoxy-benzylidine)-3-thio - 3 - isosemicarbazide] - propionic acid:

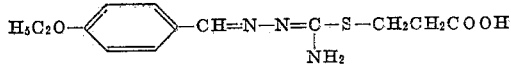

which melts at 137–139° (with decomposition), is obtained.

Example 4

By replacing the anisaldehyde thiosemicarbazone of Example 2 by an equivalent quantity of 3-ethoxy-benzaldehyde thiosemicarbazone and otherwise proceeding as described in the said example, the corresponding β-[1-(3-ethoxy-benzylidine) - 3 - thio - 3 - isosemicarbazide]-propionic acid:

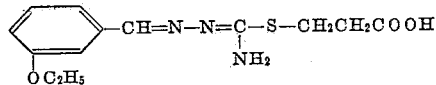

which melts at 98–102° (with decomposition), is obtained.

By using a 3-methoxy-benzaldehyde thiosemicarbazone, the corresponding 3-methoxy derivative

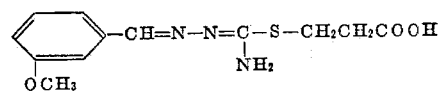

is obtained.

Example 5

A mixture of 4 parts by weight of anisaldehyde thiosemicarbazone and 2.9 parts by weight of β-bromo-propionic acid is refluxed for 1 hour in 20 parts by volume of ethanol. The ethanol is then removed in vacuo and the syrup remaining is agitated with water containing an excess of sodium acetate, which converts the amino acid hydrobromide to the free amino acid. The supernatant liquid is decanted, and the formed β-(anisylidine-3-thio-3-isosemicarbazide)-propionic acid—identical with the product of Example 2—crystallizes out on rubbing with ethanol.

Example 6

By using 3.8 parts by weight of β-iodo-propionic acid in place of the 2.9 parts by weight of β-bromo-propionic acid of Example 5 and otherwise proceeding as described in the said example, the identical product—β-(anisylidine - 3 - thio-3-isosemicarbazide)-propionic acid—is obtained.

Example 7

A mixture of 20 parts by weight of piperonaldehyde (3,4 - methylenedioxybenzaldehyde) thiosemicarbazone and 6.5 parts by weight of β-propiolactone is refluxed for 30 minutes in 150 parts by volume of acetone, then cooled, and the obtained crystals of β-(1-piperonylidine-3-thio-3-isosemicarbazide)-propionic acid:

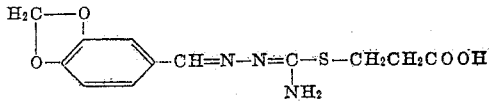

recrystallized fom ethanol; they melt at 218–220° (with decomposition).

Example 8

A mixture of 3 parts by weight of anisaldehyde thiosemicarbazone and 2.8 parts by weight of sodium β-bromo-ethanesulfonate

is refluxed for 6 hours in 30 parts by volume of ethanol to which 1.1 parts by volume of concentrated hydrochloric acid has been added. The solids which separate on cooling are filtered off, and purified by the bicarbonate treatment described in Example 1. Insoluble by-product and starting material are removed by filtration and, on the addition of acetic acid to the filtrate, β-(1-anisylidine-3-thio-3-isosemicarbazide) - ethanesulfonic acid

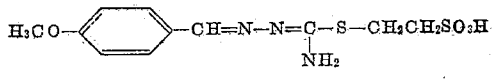

separates as the monohydrate. After recrystallization from water, the latter melts at 181–184° (with decomposition).

Having thus disclosed the invention, what is claimed is:

1. β - [1 - (4 - acetamido - benzylidine) - 3 - thio-3-isosemicarbazide]-propionic acid of the formula

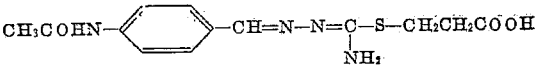

2. β - (1 - anisylidine - 3 - thio - 3 - isosemicarbazide)-propionic acid of the formula

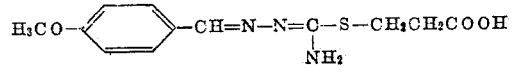

3. β - (1 - piperonylidine - 3 - thio - 3 - isosemicarbazide)-propionic acid of the formula

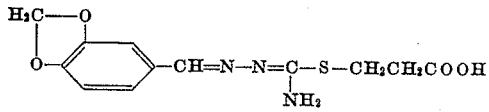

4. β-[1 - (4 - ethoxy - benzylidine) - 3 - thio - 3-isosemicarbazide]-propionic acid of the formula

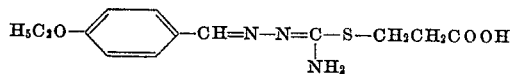

5. β-[1-(3-methoxy-benzylidine)-3-thio-3-isosemicarbazide]-propionic acid of the formula

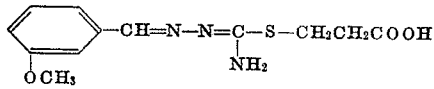

6. A member of the group consisting of a compound of the formula

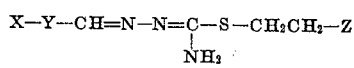

the water-soluble non-toxic salts thereof with acids, and the water-soluble non-toxic alkali metal and alkaline earth metal salts thereof, wherein Y is phenyl, X is a member selected from the group consisting of lower alkoxy and lower alkanoylamino, attached to one of the meta and para positions of Y, and methylenedioxy attached to the meta-para positions of Y, and Z is a member selected from the group consisting of COOH and $SO_3H$, X being lower alkoxy in the para position of Y when Z is $SO_3H$.

CHARLES F. HUEBNER.

References Cited in the file of this patent

UNITED STATES PATENTS

| Number | Name | Date |
|---|---|---|
| 2,474,838 | Gresham et al. | July 5, 1949 |

FOREIGN PATENTS

| Number | Country | Date |
|---|---|---|
| 76,219 | Germany | 1949 |

OTHER REFERENCES

Baird et al.: "J. Chem. Soc." (London), 1927, pp. 2527–34.

Beinstein et al.: "J. Am. Chem. Soc.," vol. 73, Mar. 1951, pp. 906–912 (presented Am. Chem. Soc. 117th meeting, Apr. 9–13, 1950).